Patented May 24, 1949

2,471,213

UNITED STATES PATENT OFFICE 2,471,213

TREATMENT OF AQUEOUS LIQUIDS

Eric Berkeley Higgins, Tewin Wood, England, assignor to Tewin Industries, Inc., New York, N. Y.

No Drawing. Application June 5, 1942, Serial No. 445,981. In Great Britain January 22, 1937

13 Claims. (Cl. 210—24)

This invention relates to the treatment of aqueous liquids and particularly the purification of water, and comprises matter divided from application for Letters Patent Serial No. 185,626, filed January 18, 1938, now Patent No. 2,291,226. Said application is concerned with the products which possess the property of polar adsorption and which consequently can be used in various commercial operations involving polar adsorptions such as the softening of water by the so-called base exchange process or hydrogen ion exchange or both, the de-alkalisation of effluents from precipitation water softening plants or the purification of trade effluents or their deacidification or both.

In the production of said new products, use is made of what is practically at the present time a waste product, namely, the residual acid tar or sludge obtained from the refining of various mineral oil fractions. This residual acid sludge contains varying amounts of sulphuric acid used in the refining process, and at the present is not only of no value, but is a positive nuisance and causes considerable difficulties and expense in its disposal.

The new bodies are prepared by the simple application of heat under suitable conditions to a residual acid sludge of the petroleum refineries as such or in which the proportion of acid already present is augmented to any suitable amount by the addition of more sulphuric acid. In some cases it is preferred to blend the sludge obtained from the lighter fractions from petroleum distillation, which tends to be liquid, with a more solid sludge before adding the further sulfuric acid.

In general, the sludges obtained from the higher boiling fractions in petroleum distillation require a great deal more additional sulphuric acid before the heating than those obtained by the refining of the lighter fractions owing to the corresponding greater amount of acid in these lighter fractions. As an example, a kerosene refinery acid sludge may contain 74 per cent of its weight of acid, whereas that from a lubricating stock may contain 12.0 per cent. The acid sludge is heated under conditions which ensure uniform heating, while stirring is not necessary after the original acid sludge has dissolved in the excess acid and formed a uniform mixture. However, it is essential, if the best results are to be obtained, that the temperature should not be allowed to rise above 120° C. before the mixture has become uniform, since otherwise, instead of obtaining the desired gelatinous product, cokey masses are liable to be formed. Such cokey masses while included within the present invention, do not possess the desired qualities to the same extent as do gels obtained from the same raw material.

It is desirable to provide means for removing any vapours formed which will almost invariably contain some of the petroleum fraction from which the sludge was obtained.

The temperature necessary for optimum yield and the time required to complete the reaction varies somewhat with the material employed, but effectively lies between 160° C. and 200° C. The reaction begins at about 150° C., but is apparently not complete below 160° C., even if the heating is continued for a considerable period, while above 200° C. the product tends to break up into extremely fine powder and becomes soluble or peptisable in water and especially in alkali solutions. At 160° C., heating for one hour may be regarded as effective, but in general it is found advantageous to continue the heating for two hours, whereupon the reaction is substantially complete.

If desired, of course, the acid sludge may be mixed with coal dust, for example, or with inactive mineral material and the new product produced in situ so as to obtain a composite mass which is a useful expedient in the preparation of the product in cases in which it is subsequently to be employed in the preparation of catalysts, or in which mere bulk is desirable as, for example, when some trade effluents are to be purified by the aid of the novel product.

The following figures afford specific examples of mixtures used, it being assumed that with each material the heating is carried out for two hours at 160° C.

1 part by weight of Mid-Continental (Lobitos) kerosene is treated with 2 parts of sulphuric acid.

1 part of Mid-Continental cylinder sludge is treated with 20 parts of sulphuric acid.

1 part of Pennsylvania solid sludge is treated with 20 parts of sulphuric acid.

1 part of Iraq white spirit sludge is treated with 2 parts of sulphuric acid.

1 part of Iraq lubrication oil sludge is treated with 40 parts of sulphuric acid.

The progress of the reaction is indicated by evolution of sulphur dioxide and its completion by the evolution ceasing or virtually ceasing and the mass setting to a gel. The time of heating should not be unnecessarily prolonged since in these circumstances, the gel formed by the reaction tends to break up into small particles and the ultimate product may then be too finely divided for many uses. The reaction may, however, be carried out successfully and completely while the gel is formed as a mass. The actual amount of acid necessary for any particular acid sludge which it is proposed to use may easily be found by trial on small samples; the correct amount is that which forms a dry, coherent mass of jelly after the reaction has taken place. If a liquid product is obtained, this shows that too much acid has been added, but on the other hand, a cokey mass shows that the quantity of sulphuric acid added is too small. Too much acid yields a product very finely divided and more or less soluble or peptisable in water, especially in alkali solutions. In general, a liquid acid sludge as indicated by the above examples, will require twice its own weight of sulphuric acid, while a solid acid sludge requires between twenty to forty times its own weight of sulphuric acid. In general, the weight of sulphur dioxide evolved during the reaction is equivalent in weight to the finished product after drying. Clearly, the sulphur dioxide given off may be used for the preparation of sulphuric acid and sulphites.

The majority of the acid present may be washed out of the end product and by the use of counter-current washing it may be obtained in the form of sulphuric acid of between 42 and 83 per cent strength, which after concentration, is suitable for use again in the process. Thus, after the heat treatment, the mass is allowed to cool, and is then washed in this way with water to eliminate the free acid. The product thus obtained is in the form of black, gelatinous lumps, neutral in reaction, but possessing the power of hydrogen ion exchange in a high degree, and can be used for that purpose, being regenerated with acid in the usual way. In this state it is also suitable for use in the de-alkalisation of liquors since it acts as an insoluble acid. The gel form of the body has but small mechanical strength and it is preferable to dehydrate the gel before use which is readily accomplished by simple drying which is best carried out in a current of hot air at temperatures not above 110° C. Great shrinkage in volume takes place in the drying and the final product has sufficient mechanical strength while retaining the above-mentioned properties of the gel. The product forms hard black nodules which are entirely resistant and insoluble in water, acids or alkali solutions whether cold or boiling. They also are unaffected by the usual organic solvents and possess the property of adsorbing gases and vapours apolarly.

The primary product can be readily converted into the sodium or calcium derivative or "salt." In order to produce such a derivative, all that is necessary is to cause the mass to come into contact with a solution containing slightly more than the stoichiometrically necessary amount of a feeble alkali, bicarbonate of soda for example, to allow the reaction to be completed and subsequently to wash and dry the product.

The necessary amount of alkali can be estimated by direct titration. Strong alkalis such as lime or caustic soda may be used to produce the neutral salt but owing to the avidity with which the neutral product adsorbs hydroxyl ions, it is difficult thus to obtain a neutrally-reacting product which is necessary, for example, to enable it to be used in water softening by base exchange. Of course, the salt complex may be prepared either direct from the dehydrated primary product or may be produced from the gel-like primary product and then employed as such or dehydrated after such treatment, for example, by drying at 100–110° C.

The following are some examples of the production of the new material for the treatment of water according to the invention.

Example 1

100 kilogrammes of Mid-Continent kerosene sludge containing 74 per cent of sulphuric acid are thoroughly mixed with 200 kilogrammes of concentrated sulphuric acid and carefully heated up to 160° C. under conditions which ensure uniform heating. The mass is kept at this temperature for two hours and the mass sets to a gel. The reaction product is then allowed to cool, and when cool, washed thoroughly with water until the last effluents of wash water are substantially free from sulphuric acid. Water containing an excess of sodium bicarbonate, actually 3 kilogrammes, in now added to the mass and the whole allowed to stand overnight.

The mass is then washed with water until the effluent is substantially free from sodium salts, and is then dried at 100° C. to yield the finished product, of which there is 8.3 kilogrammes. It has a mass density of 0.319 in water, or in the form of a filter bed amounts to 19.8 lbs. for every cubic foot occupied, the absolute density of the particles being, of course, greater than unity, and a base exchange of 7.7 expressed as a percentage of lime. It thus gives with water having a hardness of 10 parts of lime (CaO) per 100,000, a softening capacity of 245.6 litres of water per litre of filter bed.

Example 2

100 kilogrammes of Iraq white spirit sludge containing 68 per cent of sulphuric acid are thoroughly mixed with 200 kilogrammes of concentrated sulphuric acid and, as in Example 1, carefully heated up to 160° C. and kept at that temperature for two hours when it sets to a gel. The reaction product is allowed to cool and thoroughly washed with water as before. The product is now dried at 100 to 110° C. and forms a hard granular mass suitable for hydrogen ion exchange. It has a mass density of 0.392 in water and tested against calcium bicarbonate solution, a base-exchange value of 7.6 per cent dry weight reckoned as CaO.

After exhaustion, it can be regenerated with acids.

Yet again, water containing an excess of sodium bicarbonate, in this instance amounting to 5 kilogrammes, may be added to the washed mass of the reaction product and left to stand overnight. It is then washed with water until the effluent is free from sodium bicarbonate and the finished product is obtained as before by drying at 100° C. In this case, 50 kilogrammes of the dried product are obtained. It has a mass density of 0.392 in water, and a base exchange value of 7.6 per cent dry weight reckoned as CaO. Thus, with a water having a hardness of 10 parts of lime per 100,000, it gives a softening capacity of 297 litres of water per litre of filter bed.

Example 3

100 kilogrammes of Pennsylvania solid sludge containing 12 per cent of sulphuric acid are added to 4,000 kilogrammes of concentrated sulphuric acid and slowly heated to 120° C. with stirring until the solid sludge has dissolved in the acid to form a homogeneous mixture. This mixture is then allowed to heat up to 160° C. uniformly and kept at this temperature for two hours when it forms a gel. After cooling it is thoroughly washed with water, as before, and water containing an excess of sodium bicarbonate, amounting to 30 kilogrammes in this case, is added to the mass which is then allowed to stand overnight. It is then washed until the effluent shows no traces of sodium bicarbonate, and dried at 100° C. to yield 85 kilogrammes of the dried product. This has a mass density of 0.392 in water and a base exchange of 7.34 parts of lime per 100 parts of the material. Thus, on water having a hardness of 10 parts of lime (CaO) per 100,000, it has a softening capacity of 288 litres of water per litre of bed.

The new products are admirably suited for the base exchange purification of water in a manner precisely as zeolites have been used hitherto. Reference to this fact has already been made in the examples set out above, that is to say, in order to carry out purification of water by this process with the use of the new product it is necessary that the new product could be converted into its sodium salt or sodium complex. If the original product has been treated with sodium bicarbonate as indicated in some of the examples given above, it is already in the correct condition; but if it be presented for use in acid condition, in which it is obtained by washing after the reaction with or without drying, it must be converted to the sodium salt which may be done most satisfactorily by the use of bicarbonate of soda. However, if preferred, the acid material may be converted to the sodium complex by allowing to percolate through it a solution of a soluble sodium salt, the particular sodium salt being largely a matter of indifference. Sodium chloride or sodium sulphate, or any other soluble sodium salt, may be used. During this conversion, the material will act in its capacity of an hydrogen ion exchanger, taking up the sodium of the salt so that the effluent from the percolation contains the free acid formerly combined with the salt.

Clearly, if it is advantageous or desirable, an indirect method may be employed by treating the original acid product by percolation with a solution of some other soluble salt, as for example calcium chloride, when by hydrogen ion exchange, the product will form the calcium complex, rejecting the hydrochloric acid. When the calcium complex is thus formed, it may be then converted to the sodium complex by treatment with a soluble sodium salt, as for example sodium chloride, when the calcium is replaced by the sodium by base exchange.

The sodium complex thus prepared is treated exactly as zeolites are treated when used for the purification of water; but owing to the high rate of exchange, it is desirable that in regenerating the bed, that is to say, in reconverting it from the calcium complex produced by the passage through it of hard water, the salt brine be presented in a state of higher concentration than is usual with zeolites.

It has been found that for regeneration, a concentration of 10 per cent for the sodium chloride is the most advantageous concentration when employing the new compound as a zeolite-substitute. Actually if experiments are carried out by progressively increasing the concentration of the salt solution employed in regenerating the new product, it is found rather surprisingly that the effective exchange capacity of the regenerated material increases to a maximum for a particular concentration of the salt solution, and then if the concentration is further increased, the exchange capacity again falls. The desirable concentration to be used in practice can be made clear from the following brief explanation of the question of salt ratio. Theoretically 28 parts by weight of lime considered as CaO is equivalent to 58.5 parts by weight of common salt, that is, roughly a ratio of 1 part of lime to 2 parts of salt. However, this is never realised in practice since as a rule an efficiency of 33⅓ per cent is the best obtainable in single stage regeneration without loss in the base exchange capacity of the material. This represents a ratio of 1 part of lime to about 6 parts of common salt. However, a better salt ratio can be obtained within limits by sacrificing the efficiency of the base exchange compound. Thus, if a 10 per cent salt solution is used to regenerate the new product, the following exchange capacities are obtained in the regenerated product by varying ratios of lime to salt. Thus, with a ratio of 1 of lime to 6 of salt, the exchange capacity is 21,680 grains per cubic foot; while with a lime to salt ratio of 1:4, the exchange capacity is 17,568 grains per cubic foot, and with a lime to salt ratio of 1:3, the exchange capacity is reduced to 11,962 grains per cubic foot.

It will be appreciated, therefore, that two independently variable factors come into consideration for the new product, viz. the ratio of salt used to lime removed and the concentration of the salt solution employed.

The following tables show some examples of the regeneration of the new product having a mass density of 0.48; they show the results of experiments carried out on the lines indicated above in which the concentration of the salt solution is varied.

The following results are obtained when the ratio of lime actually displaced to the amount of salt employed is 1 to 6.

| Concentration of Salt Solution | Salt used | | Salt Solution used, Lbs. | Lime Removed grains per cubic ft. of materials as— | |
|---|---|---|---|---|---|
| | Grains | Lbs. | | CaCo₃ | CaO |
| Percent | | | | | |
| 1 | 31,398 | 4.485 | 448.5 | 9,345 | 5,233 |
| 5 | 50,238 | 7.177 | 143.5 | 14,952 | 8,373 |
| 10 | 72,840 | 10.405 | 104.0 | 21,680 | 12,140 |
| 15 | 66,528 | 9.504 | 63.4 | 19,800 | 11,088 |
| 25 | 43,680 | 6.240 | 25.0 | 13,000 | 7,280 |

The fact that the ratio of lime (CaO) removed to salt used is 1:6 in each case can be confirmed by comparison of the second and sixth columns in the above table.

The results obtained when the ratio of lime actually displaced to salt used is 1:4 are as follows:

| Concentration of Salt Solution | Salt used | | Salt Solution used, Lbs. | Lime Removed grains per cubic ft. of materials as— | |
|---|---|---|---|---|---|
| | Grains | Lbs. | | CaCo₃ | CaO |
| Percent | | | | | |
| 1 | 12,224 | 1.746 | 174.6 | 5,457 | 3,056 |
| 5 | 22,328 | 3.189 | 63.8 | 9,968 | 5,582 |
| 10 | 39,352 | 5.621 | 56.2 | 17,568 | 9,838 |
| 15 | 29,120 | 4.160 | 27.6 | 13,000 | 7,280 |

Here also it can be seen that the ratio of lime (CaO) removed to salt used is 1:4 in each case by comparison of the second and sixth columns.

In the above two tables, the first and fifth columns in each case come into question in regard to the amount of hardness removed with different concentrations of salt solution. It will be observed that in both of the tables, maximum exchange capacity in the regenerated product is obtained with a concentration of salt solution which lies around the neighbourhood of 10%.

In exercising its function as a zeolite, the new product has the following advantages:

1. It has a specifically higher rate of exchange than zeolites so that for the same capacity of bed, a greater quantity of water can be softened than with zeolites in each regenerative cycle.

2. It is completely indifferent to $CO_2$.

3. It is chemically very much more stable than zeolites so that if the bed should be contaminated in any way, it is possible to use the strongest reagent to purify the bed. Thus, iron may be leeched out with hydrochloric acid; organic contamination can be destroyed by treatment with a strong solution of chlorine; contamination with lime can be dissolved out with acid; acid impurities may be leeched out with alkali; and organic substances such as tar and the like may be removed by extraction with a volatile solvent. The product endures very well the detergent action of boiling soap solution so that its decontamination in case of accident is largely facilitated.

4. There is no fear of contamination of the water by the constituents of the water-softening material, as is the case where aluminates and silicates have been employed for this purpose.

5. It may be facultatively employed as an hydrogen-ion-exchanger.

It is clear that the new product may be used in that modification of the ion exchange process technically known as hydrogen-ion-exchange, that is to say, if the product be presented in its original acid condition, in the form of a filter bed, it will adsorb the cationic constituents of any dissolved salts, substituting hydrogen ion. Thus, sodium sulphate passed through the acid product has its sodium removed forming the sodium complex of the material whilst free sulphuric acid appears in the effluent.

In the field of water purification proper, this property is best made use of by ensuring that the liberated acid shall finally appear in some form which is readily removable commercially and economically, as for example, in the form of free carbonic acid which can be removed from the final effluent by volatilisation. To this end, it is frequently possible to combine the treatment of the water to be purified by two separate methods, as to one part, with the new product acting as a base exchanger, that is, as its salt, and as to another portion, with the new product acting as a hydrogen-ion-exchanger, that is, in the form of free acid.

It is clear, therefore, that if, for example, the original stream of water to be purified be divided into two parts in the ratio of its temporary and permanent hardness and then respectively treated by the two plants, and the effluents combined, the temporary hardness will supply sufficient carbonates arising from the base exchange part of the cycle to be equivalent to the total acids in the other part of the cycle.

Thus, a water containing as free acid only free carbonic acid and the minimum aggregate proportion of soluble salts, none of them cationically polyvalent, will be produced.

Clearly, the decision as to whether this method of purification should be adopted must depend on the subsequent cost, since the higher the ratio of temporary to permanent hardness in the water to be treated, the more advantageous it is. This can be shown by the following sets of assumed conditions:

First, in the case of a water in which the molecular concentrations of temporary hardness and permanent hardness are equal, the water is divided into equal parts, one of which is treated with the new product acting as a base-exchanger and the other part with a portion of the new product as a hydrogen-ion exchanger. If the temporary and permanent hardness are considered respectively as consisting of equal molecular weights of calcium bi-carbonate and calcium sulphate, these treatments may be represented by the following equations:

In one volume of water:

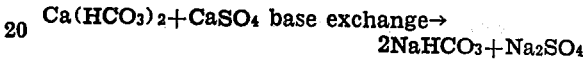
$$Ca(HCO_3)_2 + CaSO_4 \text{ base exchange} \rightarrow$$
$$2NaHCO_3 + Na_2SO_4$$

In one volume of water:

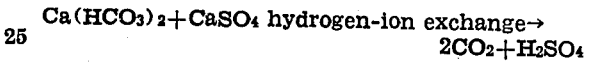
$$Ca(HCO_3)_2 + CaSO_4 \text{ hydrogen-ion exchange} \rightarrow$$
$$2CO_2 + H_2SO_4$$

Now, if the two effluents are blended, the result is as follows:

In two volumes of water:

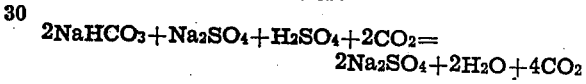
$$2NaHCO_3 + Na_2SO_4 + H_2SO_4 + 2CO_2 =$$
$$2Na_2SO_4 + 2H_2O + 4CO_2$$

The result is that in every two volumes of water treated, 4 molecular weights of dissolved solids have been reduced to 2 molecular weights, or in other words, there has been a reduction of 50 per cent in the molecular concentration of dissolved solids in the water.

Secondly, in the case of a water in which the amount of temporary harness is five times that of the permanent hardness, the water is divided, one sixth of it is treated with the reagent acting by base exchange, and the remaining five sixths by hydrogen-ion exchange. The corresponding equations in this case are:

In one volume of water:

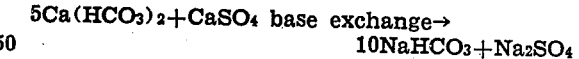
$$5Ca(HCO_3)_2 + CaSO_4 \text{ base exchange} \rightarrow$$
$$10NaHCO_3 + Na_2SO_4$$

In five volumes of water:

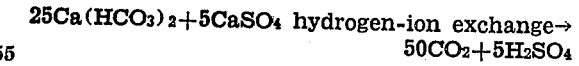
$$25Ca(HCO_3)_2 + 5CaSO_4 \text{ hydrogen-ion exchange} \rightarrow$$
$$50CO_2 + 5H_2SO_4$$

Now, when the two effluents are blended, the result is as follows:

In six volumes of water:

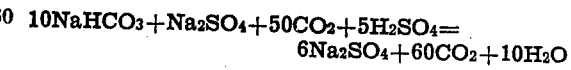
$$10NaHCO_3 + Na_2SO_4 + 50CO_2 + 5H_2SO_4 =$$
$$6Na_2SO_4 + 60CO_2 + 10H_2O$$

It will be appreciated, therefore, that in every six volumes of water treated, 36 molecular weights of dissolved solids have been reduced to 6 molecular weights, that is to say, a reduction has been effected of 83.3 per cent in the molecular concentration of dissolved solids in the water.

Thirdly, in the case of a water in which the amount of temporary hardness is one fifth that of the permanent hardness, the water is divided, five-sixths of it is treated with the reagent acting by base exchange, and the remaining one sixth by hydrogen-ion exchange. The corresponding equations in this case are:

In five volumes of water:

5Ca(HCO₃)₂+25CaSO₄ base exchange→
10NaHCO₃+25Na₂SO₄

In one volume of water:

5Ca(HCO₃)₂+5CaSO₄ hydrogen-ion exchange→
2CO₂+5H₂SO₄

When the two effluents are blended, the result is as follows:

10NaHCO₃+25Na₂SO₄+2CO₂+5H₂SO₄=
12CO₂+30Na₂SO₄+10H₂O

It follows, therefore, that in every six volumes of water treated, 36 molecular weights of solids have been reduced to 30 molecular weights, which is equivalent to a reduction of 16.6 per cent in the molecular concentration of dissolved solids in the water.

While it is clear that ion exchange phenomena are always equilibrium phenomena, in the process of water purification by the so-called base exchange process, the concentrations involved automatically place these equilibria towards the limits so as to present a picture resembling quantativity. This is not the case, however, where hydrogen is one of the ions exchanged.

Thus, it must be borne in mind that the apparent ion-exchanging capacity of the new product with natural waters will be of a lower order with the salts of the stronger acids than with the weaker, that is, with the substantially non-ionised carbonic acid as the anion in the salt to be treated, the exchange (reckoned as grains of calcium oxide adsorbed per lb. weight of new product) from a solution of calcium bicarbonate, will be substantially the same figure as would be given were the new product presented as its sodium salt and the reaction carried out under the normal conditions known as base exchange. If, however, the calcium salt were presented in the form of a salt of a strong acid, as for example sulphuric acid, to the new material in its acid or hydrogen-ion-exchanging condition, the lbs. per cubic foot adsorbed by the new product will be substantially less than would have been the case had the new product been presented as its sodium salt, the judgment being made on end point where the effluent water begins to contain appreciable quantities of the polyvalent cation, that is, technically speaking, judged on the yield of "zero" water. Clearly this fact must be borne in mind in the design of plant for the use of the new material.

It is clear that where the material is used as a hydrogen-ion exchanger, regeneration is brought about by treatment of the bed with acid solutions of substantially higher hydrogen-ion concentration than would correspond to the order of magnitude of ion concentration in the water to be treated, for example, with 1 per cent sulphuric or hydrochloric acid. It is obvious, of course, that where this operation is to be performed the containing vessels must be substantially not attacked by the acid solutions in question.

As has been previously mentioned, quite apart from the ion exchange as such, the new product prossesses considerable absorptive power for hydroxyl ions; and this property may be used in the purification of aqueous solutions—including, of course, natural waters.

The new product may therefore be used to adsorb hydrogen or hydroxyl ions from a solution, that is, it can be used for removing alkali or acid from solutions by percolation of those solutions through a bed of the materal, and clearly this property can be quantitatively increased by a previous opposite treatment of the bed, though the latter expedient will necessarily add soluble salts to the effluent—which is not necessarily the case where the previous reverse treatment has not been used.

As a practical example of the use of the novel product for this type of reaction, if water containing dissolved calcium hydroxide be passed through a bed of the new material in the form of its calcium salt, the calcium hydroxide will be bodily removed from the solution until the alkali adsorbing property of the bed is exhausted, whereafter the effluent will begin to contain calcium hydroxide in solution, the concentration of which will advance as the bed's capacity for adsorption is exhausted until the effluent has the same calcium hydroxide concentration as the intake.

On the other hand, if the same solution be passed through a bed of the new product in the form of its sodium salt, during the first phase the calcium hydroxide will be bodily adsorbed and thereafter the effluent water will contain sodium hydroxide as a consequence of a combination of ion exchange and hydroxyl adsorption.

This caustic soda solution may itself be employed in the purification of water or in any other way where the necessarily low concentration of caustic soda is not disadvantageous—for example, in the treatment of straw for the production of cattle food or paper fibre. Concentration to the solid state would in general not be profitable where caustic soda was obtainable as such at reasonable commercial prices. Where the alkali is used dilute however the process, or that which immediately follows, may be commercially advantageous.

Still further, if a bed of the new product as its sodium salt (obtainable by treatment with common salt) be treated with a solution of caustic lime until its absorption power for this alkali be satisfied wholly or in part, and then be regenerated with sodium chloride, the effluent is calcium chloride solution, the caustic soda produced by the base exchange property of the new complex being retained as such by the bed.

If now the charged bed be treated with further quantities of calcium hydroxide solution, this latter displaces the adsorbed sodium hydroxide, which appears as such in the effluent.

The cycle can be repeated indefinitely since the new product is unaffected by alkali, and a dilute solution of caustic soda thus obtained by what in the limit corresponds to the often sought reaction, viz. the direct production of caustic soda substantially free from lime salts by the interaction of common salt and lime aqueously and in the cold. Clearly, and as a corollary of the above, diluted caustic soda solution can be freed from colloidally suspended calcium or other polyvalent ions by filtration through a bed of the new product in the form of its sodium salt.

Finally, if a solution of calcium hydroxide be passed through a bed of the new product in its acid form, the ion exchange will result in the total adsorption of the calcium ion and the neutralisation of the hydroxyl anion, so that the effluent water will be neutral and salt-free.

These properties can be made use of in a practical way in the purification of trade effluents and in particular in conjunction with the well-known and practical precipitation methods of the purification of water such as the lime-soda process.

As examples of the purification of effluent waters, a bed of the new material either in the acid or in the salt condition as dictated by the circumstances, is capable of removing from effluent water, metals, the removal of which is desired either on account of the poisonous nature of the material or its value. In the latter case, as for example with metallic gold, recovery of the metal becomes extremely simple inasmuch as the bed, being carbonaceous, can be readily burnt away leaving the residual metal as such.

In its acid form, the novel product may be employed in a similar manner entirely to remove protein material in waste from food factories or sewage disposal plants, which again on account of the combustibility of the material can be readily disposed of, it being usually of no commercial value to recover such removed impurities.

Alternatively, where the material to be removed from waste is of a protein nature and not injurious to growing crops (as, for example, occurs in effluents from dairies), or the waste to be treated is an effluent containing horticultural valuable cations, such as potassium or ammonium salts, the bed containing the impurities may be employed direct as a fertiliser, which not only is an economical method of disposing of the undesired protein but is a permanent improvement to the soil so dressed by the increase in base exchange capacity of the tilth upon which the fertility of soil directly depends.

It is clear that in such instances where the bed of material may have to act as a filter of gross impurities as well as exercising its adsorptive power upon the soluble constituents of the effluent, it may become advantageous to adopt the expedient of adding inert material to the original acid sludge before its conversion to the new active material, which will thus be dispersed as an extremely fine and active film upon a mechanically acting sub-stratum.

In the well known and much practised process of water purification by precipitation, the lime-soda process, it is well known that the troublesome delay in the floculation or coarsening of crystals of the precipitate or both, especially when much magnesium is present, may be largely avoided if an excess of lime over and above that required for the desired reaction be employed; but such an alteration has the disadvantage of yielding an alkaline water due to such added excess. This necessitates further additions to the water, such as aluminium salts, phosphates, and the like, so that there has developed the alternative technique of operation at the boil—satisfactory enough where the water is to be used as boiler feed but clearly inadvisable where the heat cannot be usefully evaluated and obviously impractical where the water is an effluent for which the purification down to water-conservancy levels imposes what is substantially the same process as that used for water purification for use. Further, in practice it is not possible to obtain by the straight-forward cold lime-soda process a water entirely free from hardness and 20 to 50 milligrammes of lime calculated as CaO per litre remaining, can be considered very good practice.

To overcome this drawback to the otherwise very practical process with its substantial reduction of dissolved solids (in contradistinction to base exchange which does not reduce the total solids) its ability to deal with unfiltered water and its contribution to biological purity, many attempts have been made to combine the lime-soda process with base exchange. Great difficulties arise, however, from the fact that excess of lime will destroy the zeolites chemically whilst exact precipitation (and even with excess of lime if the water be highly magnesian) leads to precipitation of calcium carbonate or magnesium hydroxide-carbonates or both upon the base exchange body with subsequent loss of its activity.

Additional chemicals added to the water stream between the lime and base exchange plant as a rule in practice have not achieved the success their ingenuity merits.

The new product provides a solution to this problem according to several routes. The precipitation may be conducted with an excess of lime (say 30–50 milligrams of CaO per litre or even more) which leads to rapid precipitation, and the effluent water containing caustic lime and perhaps magnesium hydrate may be passed directly through a bed of the new material as its sodium salt. The material is not destroyed by the alkali and the free OH is adsorbed by the bed whilst base exchange eliminates the last traces of Ca and Mg so that a "zero" neutral water is obtained.

The bed is regenerated by employing a salt brine acidified—for example with HCl to an extent corresponding to the alkali adsorbed in the previous cycle, the phenomena of base exchange and simple neutralisation being considered separately. The alternative which may appear obvious of passing the alkaline effluent through the new body in its acid condition and thus employing it as an "insoluble acid" neutraliser and ion exchange in respect to the calcium and magnesium cations still remaining, is, however, not to be recommended for intake water insomuch as the hydrogen ion exchange with the cations of the neutral salts present, for example, sodium chloride, may produce an effluent acid and, in necessary absence of buffering carbonates (after the lime treatment) with mineral acid a very dangerous intake impurity, though for effluents this simple expedient may often suffice.

Alternatively, it is clear one may separate the dual actions of the new material by causing the lime-soda effluent to pass first through a bed of the new material as its calcium salt, which bed will exert no cationic effect upon the effluent but will act in its function of adsorber of calcium and magnesium hydroxides—regeneration of this bed being with acid and calcium chloride, for example, the acidified effluent from a base exchange plant.

The neutral water may now pass to a bed of the new material in the form of its sodium salt in which normal base exchange takes place and regeneration is with salt. This is in general, however, not so practical a process as the first-mentioned, the apparent advantage of separation of function notwithstanding.

Where the purified water is to be heated and consequently opportunity for expulsion of any free carbon dioxide occurs as, for example, in de-aerators, it is in general advantageous to use the hydrogen-ion exchange property of the new product to eliminate the temporary hardness of the water as before particularised, but where degassing is not in question, such high proportions of aggressive carbon dioxide as would result without degassing would render such process unpractical.

Where total dissolved salts were of such consequence that straight base exchange was not attractive, the theoretically possible alternative of selective precipitation of the temporary hardness becomes practical only by use of the new product. According to this modification, the water is treated with sufficient lime to eliminate the temporary hardness and no soda is added. The same expedient as for lime-soda is adopted by causing the effluent to pass through a bed of the sodium salt of the new product in which the permanent hardness and free alkalinity consisting of calcium and magnesium hydroxides, are adsorbed. Regeneration is effected by acidified brine as before. This alternative is indicated in particular (wholly or in part) when the raw water contains suspended matter or is biologically contaminated or both.

I claim:

1. The process for the softening of water which comprises subjecting the water containing water-hardening compounds to contact with a cation-exchange material produced by heating a residual acid sludge from the refining of mineral oil fractions, and treating the resultant heated sludge mass with an alkali metal compound, and separating the water from said cation-exchange material.

2. The process for the softening of water which comprises subjecting the water containing water-hardening compounds to contact with a base-exchange material produced by heating a residual acid sludge from the refining of mineral oil fractions and then neutralising the resulting product, and separating the water from said base-exchange material.

3. The process for the softening of water which comprises subjecting the water containing water-hardening compounds to contact with a base-exchange material produced by heating a residual acid sludge from the refining of mineral oil fractions, drying the resultant product and then neutralising same with an alkali metal bicarbonate, and separating the water from said base-exchange material.

4. The process for the removal of acidity from an acid-containing aqueous solution which comprises effecting the adsorption of hydrogen ions from the solution by contact with a polar adsorbent produced by heating a residual acid sludge from the refining of mineral oil fractions and neutralising the resulting product, and removing the aqueous solution from said polar adsorbent.

5. The process for the removal of temporary and permanent hardness from water which comprises dividing the water to be treated into two parts substantially in the ratio of the amounts of the contained temporary and permanent hardness, subjecting the two parts respectively to contact with one of the reagents produced by the action of sulphuric acid and heat upon the acid-extractible constituents of raw petroleum respectively in the neutralised condition and in the acid condition and blending the effluents from the said two treatments.

6. The process for the recovery of metal present in solution in an aqueous liquid which comprises subjecting the liquid to contact with a reagent produced by the action of sulphuric acid and heat upon the acid-extractible constituents of raw petroleum, which reagent has been neutralised before use, and removing the aqueous liquid from said reagent.

7. The process for the removal of temporary and permanent hardness from water which comprises rapid precipitation of the hardness by the addition of soda and an excess of lime to the water and in passing the resulting effluent water to remove the last traces of calcium and magnesium therefrom through a bed of a base-exchange material produced by heating a residual acid sludge from the refining of mineral oil fractions and neutralising same.

8. In the processes of the purification of water by precipitation with lime and soda and of the removal of temporary hardness by an excess of alkali, the method of removing excess of the reagents by apolar adsorption which comprises passing the effluent liquid through a bed of the calcium complex of a product produced by the action of sulphuric acid and heat upon the acid-extractible constituents of raw petroleum and regenerating said bed with an acidified solution of calcium chloride.

9. In the processes of the purification of water by precipitation with lime and soda and of the removal of temporary hardness by an excess of alkali, the method of removing excess of the reagents and completing the purification by apolar adsorption, which comprises passing the effluent liquid through a bed of a product produced by the action of sulphuric acid and heat upon acid sludge from the refining of petroleum and neutralising said product by a sodium salt and subsequently regenerating said bed with an acidified solution of common salt.

10. In the processes of water purification by precipitation with lime and soda and of the removal of temporary hardness from water by the use of an excess of alkali, the method of removing excess of the reagents by apolar adsorption and completing the purification by a polar adsorption which comprises passing the effluent liquid through a bed of the metal complex of a product produced by the action of sulphuric acid and heat upon the acid-extractible constituents of raw petroleum and regenerating said bed with an acidified solution of an ionizable salt of said metal.

11. A cyclic process for the cation-exchange treatment of an aqueous solution containing cation replaceable substances which comprises contacting said aqueous solution with a cation-exchange material produced by heating a residual acid sludge from the refining of mineral oil fractions and treating the resultant mass of sludge material with an alkali metal compound, removing the aqueous solution from said cation-exchange material, regenerating said cation-exchange material by further treatment with said alkali metal compound, and contacting the regenerated cation-exchange material with additional aqueous solution to be treated.

12. The cyclic process as in claim 11, wherein the alkali metal compound is a ten percent solution of sodium chloride.

13. The process as in claim 5, wherein the volume of water is proportionately divided in accordance with the ratio between the temporary and permanent hardness therein, the greater part being treated with the neutralized reagent and the lesser part treated with the acid reagent where the permanent hardness is in preponderance, and the greater part being treated with the acid reagent and the lesser part with the neutralized reagent where temporary hardness is in preponderance.

ERIC BERKELEY HIGGINS.

(References on following page)

REFERENCES CITED

The following references are of record in the file of this patent:

UNITED STATES PATENTS

| Number | Name | Date |
|---|---|---|
| 960,887 | Gans | June 7, 1910 |
| 1,172,021 | Grinberg | Feb. 15, 1916 |
| 1,397,629 | Fry | Nov. 22, 1921 |
| 1,978,447 | Austerweil et al. | Oct. 30, 1934 |
| 1,996,136 | Zimmerman | Apr. 2, 1935 |
| 2,025,715 | Bird | Dec. 31, 1935 |
| 2,127,310 | Riley | Aug. 16, 1938 |
| 2,198,378 | Ellis | Apr. 23, 1940 |
| 2,198,381 | Ellis | Apr. 23, 1940 |
| 2,208,171 | Urbain | July 16, 1940 |
| 2,208,172 | Urbain | July 16, 1940 |
| 2,214,689 | Burrell | Sept. 10, 1940 |
| 2,226,743 | Riley | Dec. 31, 1940 |
| 2,291,226 | Higgins | July 28, 1942 |

FOREIGN PATENTS

| Number | Country | Date |
|---|---|---|
| 282,165 | Great Britain | Dec. 19, 1927 |
| 450,575 | Great Britain | July 21, 1936 |
| 459,269 | France | Sept. 1, 1913 |
| 467,240 | Great Britain | June 14, 1937 |
| 608,171 | France | Apr. 17, 1926 |